(12) United States Patent
Rautiainen

(10) Patent No.: US 6,312,207 B1
(45) Date of Patent: Nov. 6, 2001

(54) METHOD AND APPARATUS FOR TRANSPORT OF BLOWABLE THERMAL INSULATION

(75) Inventor: Keijo Rautiainen, Saarijärvi (FI)

(73) Assignee: Termex-Eriste Oy (FI)

( * ) Notice: Subject to any disclaimer, the term of this patent is extended or adjusted under 35 U.S.C. 154(b) by 0 days.

(21) Appl. No.: 09/424,921

(22) PCT Filed: Jan. 25, 1999

(86) PCT No.: PCT/FI99/00049

§ 371 Date: Dec. 1, 1999

§ 102(e) Date: Dec. 1, 1999

(87) PCT Pub. No.: WO99/54234

PCT Pub. Date: Oct. 28, 1999

(30) Foreign Application Priority Data

Apr. 17, 1998 (FI) .......................................................... 980852

(51) Int. Cl.[7] ...................................................... B65F 9/00
(52) U.S. Cl. ..................... 414/398; 406/39; 406/112; 406/153; 406/197; 406/198; 414/809
(58) Field of Search ........................... 406/39, 57, 112, 406/109, 110, 197, 198, 153, 398, 400; 414/809

(56) References Cited

U.S. PATENT DOCUMENTS

| | | | |
|---|---|---|---|
| 2,511,246 | * 6/1950 | Chamberlin | 214/83.18 |
| 3,511,396 | * 5/1970 | McWilliams | 214/152 |
| 3,827,585 | * 8/1974 | McWilliams | 214/41 |
| 4,283,164 | * 8/1981 | Reaney | 414/396 |
| 4,533,280 | * 8/1985 | Elliott et al. | 406/57 |
| 4,552,489 | * 11/1985 | Jacobson et al. | 406/39 |
| 4,780,041 | * 10/1988 | Ashby | 414/398 |
| 5,015,145 | * 5/1991 | Angell et al. | 414/547 |
| 5,271,695 | * 12/1993 | Bischof et al. | 406/114 |
| 5,518,344 | * 5/1996 | Miller et al. | 406/39 |
| 5,556,237 | * 9/1996 | Rexius | 406/32 |
| 5,713,494 | * 2/1998 | Kaiju et al. | 222/199 |
| 6,036,406 | * 3/2000 | Rexius | 406/39 |

FOREIGN PATENT DOCUMENTS

| | | |
|---|---|---|
| 28 24 906 | 12/1979 | (DE) . |
| 196 36 581 | 12/1997 | (DE) . |
| 0 013 591 | 7/1980 | (EP) . |
| 61935 | 6/1982 | (FI) . |
| 84998 | 11/1991 | (FI) . |
| 102208 B | 10/1998 | (FI) . |
| 2 192 662 | 1/1987 | (GB) . |

* cited by examiner

Primary Examiner—Christopher P. Ellis
Assistant Examiner—Joe Dillon, Jr.
(74) Attorney, Agent, or Firm—Connolly Bove Lodge & Hutz LLP

(57) ABSTRACT

The invention relates to a method for treatment of blowable thermal insulation, whereby thermal insulation, such as woodfiber wool, cellulose wool, mineral wool, glass wool and/or like is being led by means of one or several filling means (3a) to a transport space (1), such as a container or like, the internal volume of which may be changed, in order to transport thermal insulation in the transport space (1) to its destination of use and to unload same from the transport space (1) to a reception point essentially by blowing carried out by a blow arrangement. Thermal insulation is being led to a filling space (1x), that is limited from the transport space (1) by means of a filling device (3b), which filling space is being expanded along filling of same by moving the filling device (3b) in the transport space (1) in the longitudinal direction of same (s1) towards unloading end (Pp) of same. The invention relates also to an apparatus operating according to the method.

8 Claims, 5 Drawing Sheets

Figure 3B:
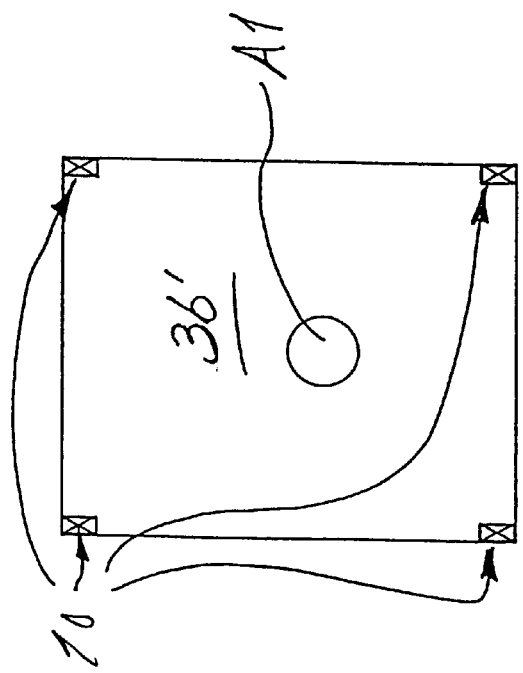

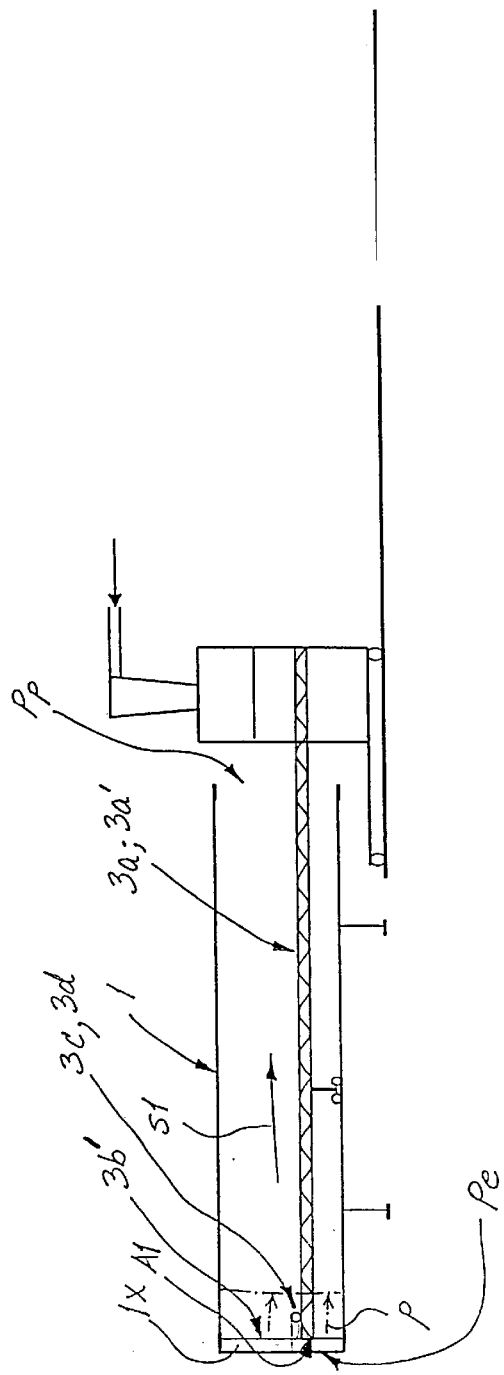
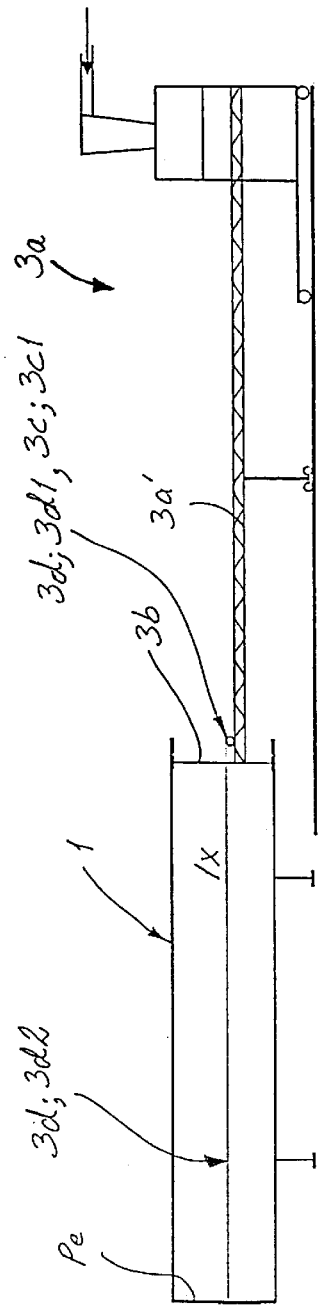
FIG. 1a
FIG. 1b

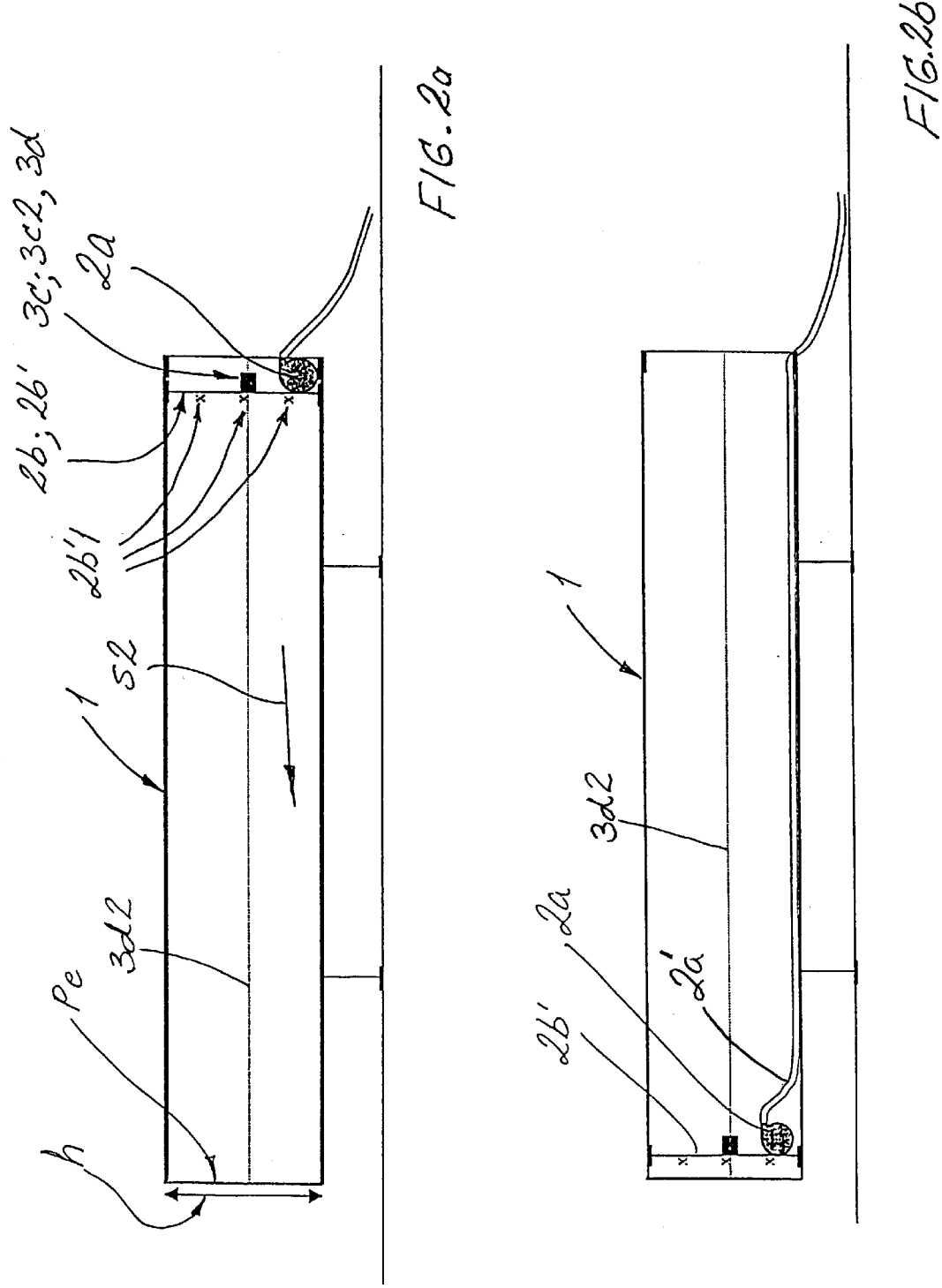

METHOD AND APPARATUS FOR TRANSPORT OF BLOWABLE THERMAL INSULATION

The invention relates to a method for treatment of blowable thermal insulation, whereby thermal insulation, such as woodfiber wool, cellulose wool, mineral wool, glass wool and/or like is being led by means of one or several filling means to a transport space, such as a container or like, the internal volume of which may be changed, in order to transport thermal insulation in the transport space to its destination of use and to unload same from the transport space to a reception point essentially by blowing carried out by a blow arrangement. During filling of the transport space thermal insulation is being led to a filling space, that is limited from the transport space by means of a filling device, which filling space is being expanded known as such along filling of same by moving the filling device in the transport space in the longitudinal direction of same towards unloading end of same.

The type of method and device particularly for packing cellulose wool in a transport space and unloading from same as described above is previously known from Finnish Patent No. 84998. According to this solution cellulose wool is being led to a transport container at its manufacturing density e.g. directly from a manufacturing process by means of an air flow through an opening existing at the roof of the container. Inside the container there is a compressing and unloading device, which first of all compresses cellulose wool at a packaging density that is higher than its manufacturing density and on the other hand while unloading of cellulose wool from the transport space brings same to an essentially lower operational density than the packing density, in order to transport cellulose wool furthermore to its destination of use. The compressing and unloading device comprises a piston-like wall surface, which moves inside the transport space in the longitudinal direction of the same and the meaning of which is to bring cellulose wool to the packing density by pressing same and to unload cellulose wool furthermore from the transport space to the destination of use by exploiting a mechanical tearing and carding arrangement existing in connection with the same. The tearing and carding arrangement comprises a conveyor, that lifts cellulose wool from below upwards, to which there has been attached furthermore several separate tearing and carding means. In the solution above furthermore guiding means are being exploited for guiding movement of the compressing and unloading device inside the container, that is carried out by hydraulic cylinders in order to bring about an appropriate transportation density of the thermal insulation.

Several problems are related to the solution above, that is why it has not been exploited too much in practice. One basic problem is that, that cellulose wool is being blown to the container, which causes first of all disproportionately much dusting. On the other hand it is impossible to compress cellulose wool being blown to the container efficiently enough in practice by the type of principle described above, because it is first of all difficult to press together cellulose wool material, that has been blown to a particularly high heap. The solution above is bad for that reason as well, that the charging hole is at the center of the container, that is why the container must be filled over more than half of its volume before it is possible to compress contents of the same or otherwise the heap being formed at the center of the container must be pressed at the back part of the container, which requires interrupting feeding of cellulose wool to the container. The type of compression packing is thus not advantageous to be used in connection with cellulose wool for that reason, that cellulose wool can not be packed homogeneously enough, but instead the density of cellulose wool varies disproportionately much in the container. This naturally causes problems during unloading phase of the container also, whereby the unloading device may take e.g. a so called miss hit at places where cellulose wool is scarcer. Several problems are also involved with the unloading and blowing arrangement being exploited in the solution in question, one of the most crucial of which may be mentioned disproportionately high formation of dust. In addition to that the solution in question is based on a hydraulically used unloading device, the movement of which requires relatively complicated hydraulics with pipes and actuator cylinders. This type of device makes also the operating efficiency worse by decreasing the potentially effective transport space of the container, because of excessive need for room of the device in question.

On the other hand in Finnish Patent FI 61935 there has been presented a method and device, that is meant particularly for filling particularly a longitudinal space with insulative particle-like material. In this connection there has not, however, actually been represented the present invention or either a solution, that could be exploited for similar purpose, that would be meant particularly for feeding blowable thermal insulation into a transport space, in order to transport same in the transport space to its destination of use and for unloading same from the transport space furthermore at the reception point.

The method according to the present invention is aimed to achieve a decisive improvement in the problems described above and thus to raise essentially the level of prior art in the field. To achieve this aim the method according to the invention is primarily characterized by, that thermal insulation is being led to the filling space by means of a mechanical filling means, such as a screw or scraper conveyor and/or like, that is led through the filling device, that closes the transport space in an essentially vertical direction.

As the most important advantages of the method according to the invention may be mentioned simplicity, reliability and environmentally friendliness of its use as well as of those device solutions suitable for the same, which enables thus transportation of thermal insulation, which is nowadays usually packed separately by one-off packing, advantageously directly by container transportation without any intermediate packing stages and costs. Thanks to the method it is furthermore possible to pack blowable thermal insulation to be transported very homogeneously. The method according to the invention enables also as efficient exploitation of the internal space of the container as possible, because the apparatus applying the method according to the invention does not take very much room inside the container. The method according to the invention is advantageous with a view to usage also in such respect, that it does not require any kind of operational interruptions during filling stage in order to achieve an adequate transportation density of thermal insulation, because this effect may be carried out simultaneously during filling of the container so to say automatically, when the filling space limited by the filling device gets larger advantageously directly by pressure influence of thermal insulation being led already to the filling space. Furthermore as an advantageous embodiment the thermal insulation is being led to the filling space by means of a mechanical filling means, such as a screw conveyor or like, whereby dusting problems that are typical to present solutions may be avoided. When exploiting the method advantageously, an internal unloading arrangement is being used as well, that is placed totally inside the container in a way, that thermal insulation to be unloaded is being blown directly from inside of the container to the reception point by means of the blow device.

In this connection there are reasons to point out furthermore the fact, that such an advantageous way of action of the present invention, that the filling device is being moved by pressure influence of thermal insulation being led already to the filling space, may be carried out in a technically functional way particularly for the part of the thermal insulation being handled in this connection only by using a mechanical feeding device for feeding of thermal insulation, because when leading thermal insulation to the transport space e.g. traditionally by blowing, it is not in any way possible to use such a high feeding pressure in practice, that would enable movement of the feeding device by influence of thermal insulation at least so, that a corresponding homogeneity of packed thermal insulation could be achieved in the transport space, as can be achieved by the present invention. Furthermore it should be also noticed in this connection, that dusting problem is particularly harmful in this type of use, which can be avoided almost totally by using the type of mechanical feeding device represented herewith.

Advantageous embodiments of the method according to the invention are represented in the dependent claims related to the method.

The invention relates also to an apparatus operating according to the method, which has been described in greater detail in the preamble of the independent claim related to the same. The primarily characteristic features of the apparatus have been presented in the characterizing part of the corresponding claim.

As the most important advantages of the apparatus according to the invention may be mentioned simplicity, reliability and environmentally friendliness of construction, use and operating principle of the same, which enables a container transportation for all kinds of thermal insulations and which operates reliably enough and is very efficient economically as well. The apparatus according to the invention comprises a filling device, which limits a separate filling space from the internal space of the container during the filling phase of the same, into which space thermal insulation to be transported is led as an advantageous embodiment by means of a screw conveyor. By this kind of filling arrangement it is possible to avoid dusting problem, that is typical to traditional solutions. As an advantageous embodiment the movement of the filling device is being guided e.g. by means of a chain, that is unwound from a reel belonging to the filling device and that is connected to the back wall of the container, the drawing power of which is being limited e.g. by means of a brake, in which case the density of thermal insulation to be packed may be adjusted in an appropriate manner by preventing movement of the filling device, that moves by influence of the pressure influence of thermal insulation. As an advantageous embodiment, the apparatus comprises furthermore an unloading device being exploited during unloading of the transport space, that is connected during an unloading stage advantageously e.g. to a chain connected to the back wall of the container in order to move the unloading device along emptying of the container towards the back wall of the same by influence of a winch driving the chain.

The dependent claims directed to the apparatus set forth preferred embodiments for the apparatus of the invention.

Figure 3A:
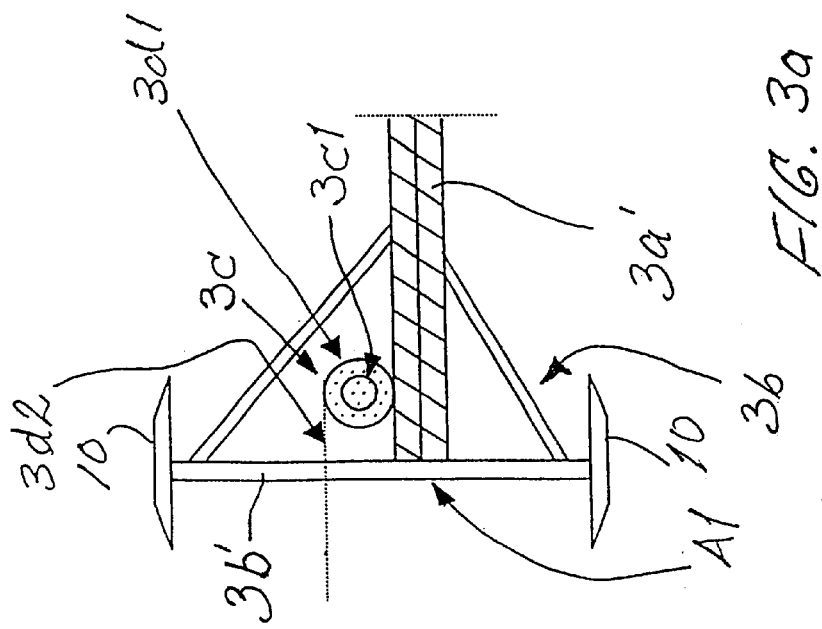
Figure 4B:
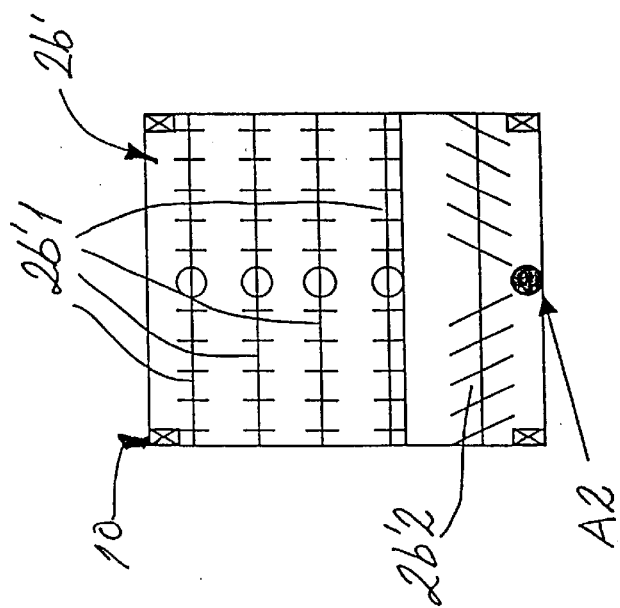
Figure 4A:
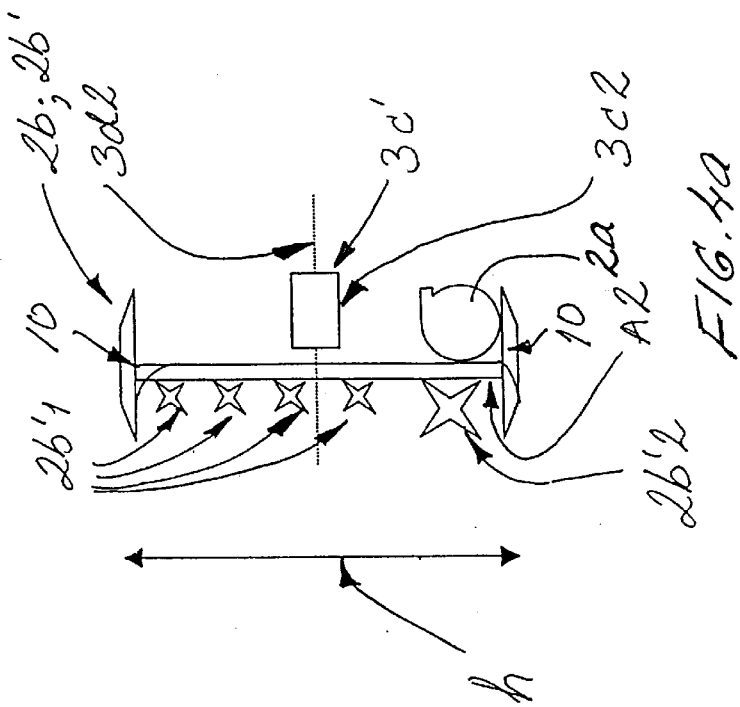
Figure 5B:
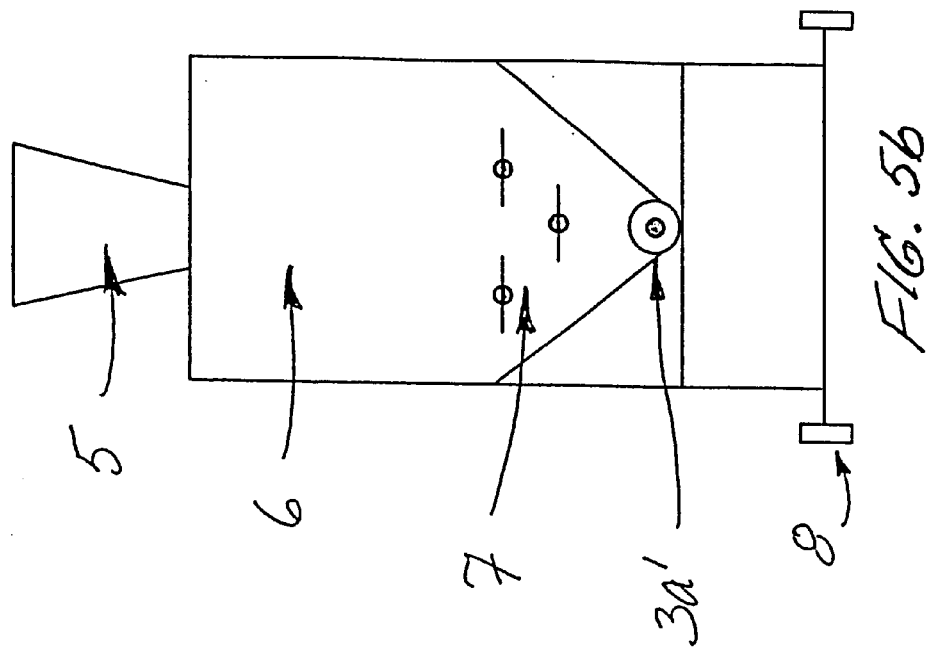
Figure 5A:
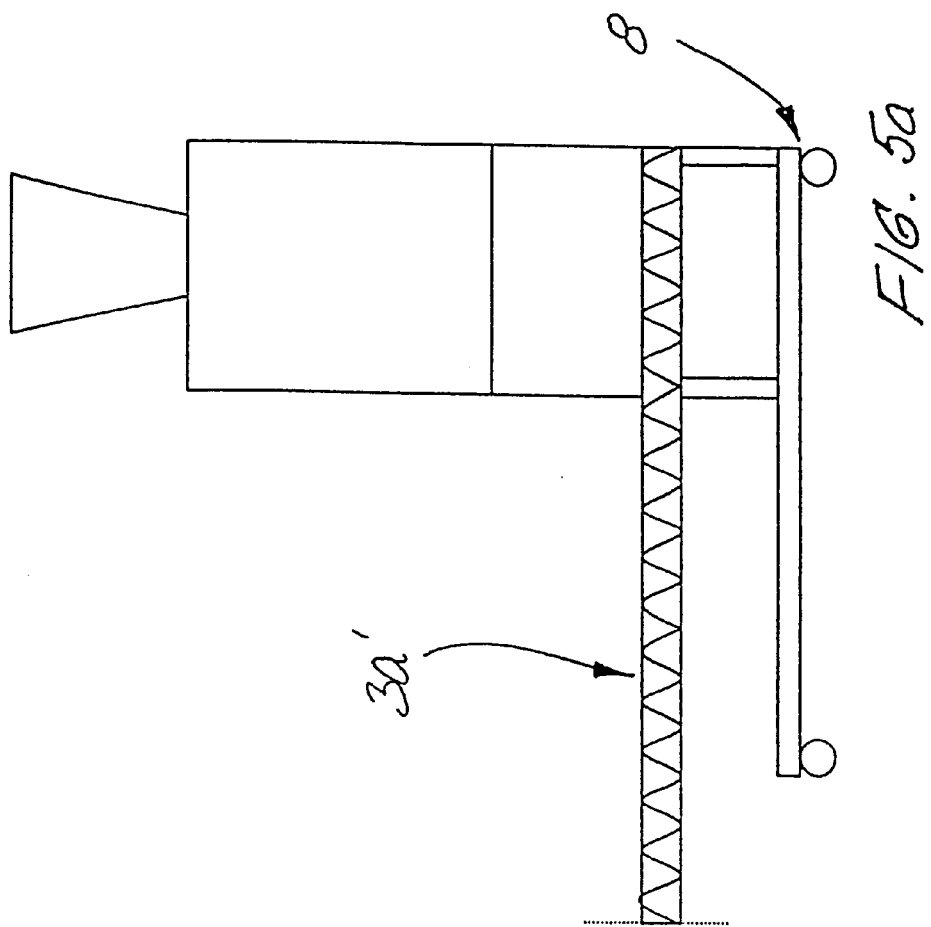

In the following specification, the invention will be described in detail with reference made to the accompanying drawings, in which FIGS. 1a and 1b show an advantageous method and apparatus according to the invention particularly during a starting phase (1a) and end phase (1b) of filling of the transport space, FIGS. 2a and 2b show correspondingly an advantageous method and apparatus according to the invention during the starting phase (2a) and end phase (2b) of unloading of the transport space, In FIGS. 3a and 3b there has been represented an advantageous feeding device of an apparatus exploiting the method according to the invention as a view of principle as seen from the side (3a) and as seen from the front (3b), FIGS. 4a and 4b show an advantageous unloading device of an apparatus exploiting the method according to the invention as a side view (4a) and a front view (4b) of principle and FIGS. 5a and 5b show furthermore an advantageous feeding apparatus for transmitting of thermal insulation in an apparatus according to the method to the feeding means filling the transport space as a side view (5a) and a front view (5b) in principle.

The invention relates to a method for treatment of blowable thermal insulation, whereby thermal insulation, such as woodfiber wool, cellulose wool, mineral wool, glass wool and/or like is being led by means of one or several filling means 3a to a transport space 1, such as a container or like, the internal volume of which may be changed, in order to transport thermal insulation in the transport space 1 to its destination of use and to unload same from the transport space 1 to a reception point essentially by blowing carried out by a blow arrangement 2a. During filling of the transport space 1 thermal insulation is being led to a filling space 1x, that is limited from the transport space 1 by means of a filling device 3b, which filling space is being expanded known as such along filling of same by moving the filling device 3b in the transport space 1 in the longitudinal direction of same s1 towards unloading end Pp of same. During filling of the transport space 1 thermal insulation is being led to the filling space 1x by means of a mechanical filling means 3a', such as a screw or scraper conveyor and/or like, that is led through an opening A1 existing in the filling device 3b, that closes the transport space 1 in an essentially vertical direction.

As an advantageous embodiment of the method, the filling space 1x is being expanded particularly on the principle shown in FIG. 1a essentially by means of pressure influence p caused by thermal insulation being led already to the filling space.

Furthermore as an advantageous embodiment, movement of the filling device 3b is being guided by means of operating means 3c particularly in order to achieve an appropriate density of the thermal insulation being led to the filling space 1x, by combining the filling device 3b with the transport space 1 by means of a retardable movement arrangement 3d. This principle is shown e.g. in FIGS. 1a, 1b and 3a.

Furthermore as an advantageous embodiment of the method with reference particularly to the operating phase shown in FIGS. 2a and 2b, a mechanical unloading device 2b is being used for unloading of blowable thermal insulation existing in the transport space 1, that moves in the transport space 1 and at the front of which there has been arranged mechanical dischargers, whereby the thermal insulation being loosened by means of the same is being blown further to the reception point by a blow arrangement 2a. Thermal insulation existing against a mechanical unloading device 2b' as shown e.g. in FIGS. 4a and 4b is being unloaded by side-dischargers 2b'1 to a collecting discharger 2b'2 existing at the bottom edge of the unloading device 2b', in order to collect thermal insulation preferably from the opposite bottom edges of the transport space 1 to a discharge opening A2 existing at the center of the unloading device 2b'. In this way first of all transportation of unloaded thermal insulation to the reception point by means of an exhaust blower 2a is enabled, that takes place totally inside the transport space 1, thanks to which dusting may not occur significantly to the outside.

Particularly during the end phase of filling as shown in FIG. 1b the filling device 3b is removed as an advantageous embodiment from inside of the container 1 and the opening of the container is closed. Correspondingly during the starting phase of unloading as shown in FIG. 2a the unloading device 2b' is being placed at the opening of the container after opening the same.

Furthermore as an advantageous embodiment of the method, the unloading device 2b' is being moved on the principle shown in FIGS. 2a and 2b in the transport space 1 in the longitudinal direction s2 towards the back wall Pe of the same by a movement arrangement 3d; 3d2, that is connected to the transport space 1 and that is operated by means of operating means 3c, which solution has been described in greater detail below.

An apparatus according to the invention for treatment of blowable thermal insulation, such as woodfiber wool, cellulose wool, mineral wool, glass wool and/or like particularly for container transportation of same comprises, when compared particularly to traditional solutions, first of all a filling space 1x for thermal insulation to be led into transport space 1, which space is limited from the transport space 1 by a filling device 3b. This filling space 1x is arranged expandable along filling of the same on the principle shown in FIG. 1a, by moving the filling device 3b in the transport space 1 in the longitudinal direction s1 of the transport space towards the unloading end Pp of the same. The filling means 3a' is carried out by a screw conveyor, which leads thermal insulation through a charging hole A1, that exists in the filling device 3b closing the transport space 1 on the principle shown e.g. in FIGS. 3a and 3b.

As an advantageous embodiment the apparatus comprises operating means 3c particularly for guiding movement of the filling device 3b, that is moved by means of pressure influence p caused by thermal insulation being led already to the filling space 1x particularly in order to achieve an appropriate density of thermal insulation being led to the filling space 1x. This has been carried out as shown e.g. in FIGS. 1a and 1b and 3a and 3b by connecting the filling device 3b, that is equipped e.g. with guiding slide rails 10, to the back wall Pe of the transport space 1 with a chain 3c2, that is unwound from a reel 3d1, and by resisting unwinding of the same from the reel 3d1 by means of a brake 3c1.

Correspondingly the unloading device 2b' comprises preferably several side-dischargers 2b'1 being placed on top of the other in the height direction h, in order to unload thermal insulation inside the container to a collecting discharger 2b'2 existing at the bottom edge of the same. This collecting discharger 2b'2 means e.g. a screw conveyor, the opposite ends of which is equipped with threadings at opposite directions, which leads loosened thermal insulation from the opposite bottom edges of the transport space to a discharge opening A2 existing at the center of the unloading device. As an advantageous embodiment the unloading device 2b' may be operated by the operating means 3c so, that the unloading device 2b' equipped with guiding slide rail 10 is connected to a chain 3d2, that is driven by a winch 3c2 and connected to the back wall Pe of the container, that has thus remained visible during filling.

In FIGS. 5a and 5b there has been shown as an example furthermore one possible feeding apparatus as a front view and as a side view for leading of thermal insulation to the filling means 3a; 3a'. The presented embodiment comprises a design, that is equipped particularly with a cyclon, in the upper part of which there exists a cyclon 5, that receives thermal insulation, a storage room 6 placed after the above and furthermore tighteners 7 after the latter, by means of which the treated thermal insulation may be guided furthermore to the filling screw 3a'. The filling apparatus is equipped e.g. by rings 8 or guiding rails in order to guide and enable movement of the same during filling phase of the transport space 1. For movement of the feeding apparatus it is furthermore possible to use most heterogeneous power transmission arrangements, that are operated e.g. by pressure medium, electricity and/or combustion motors. A transport space instead, that would be moveable in connection with stationary feeding apparatus, hardly offers a solution, the operating and reliability of which would correspond to the solutions being described above.

It is obvious, that the invention is not limited to the above-depicted or described application as there may be a wide range of modifications within the scope of fundamental idea of the invention. Thanks to the advantageous basic idea of the invention it may thus be furthermore possible to lead thermal insulation to an expandable filling space according to the invention e.g. by blowing, whereby, however, a more accurate attention must be paid to tightening of the edges of the filling device than in the present embodiment in order to avoid dusting problems. Correspondingly the mechanical filling means may be carried out by most heterogeneous solutions instead of a screw conveyor, e.g. by scraper conveyors or like. Correspondingly for movement of the unloading device and the filling device in the transport space may be carried out e.g. by one or several slide rails existing on the walls of the transport space instead of the slide friction principle being shown in the drawings. This type of solutions probably decrease also the effective internal space of the transport space.

What is claimed is:

1. An apparatus which transports blowable thermal insulation comprising:

an open ended container having a longitudinal direction, arranged to be transportable and defining a transport space, said container open towards an unloading end to be unloaded at a reception point;

a filling device arranged for leading thermal insulation through the transport space along the longitudinal direction for filling said container, including a movable partition providing closure of said open end;

a filling space bounded by said transport space and variably defined by partition movement along the longitudinal direction;

a filling means constructed and arranged to fill said container by leading thermal insulation to said filling space.

2. An apparatus according to claim 1 further comprising operating means to guide movement of the filling device by means of a pressure influence caused by thermal insulation being led into the filling space to achieve an appropriate density of thermal insulation in the filling space, said operating means comprising a retardable movement arrangement connecting the filling device to a back wall of the container with a chain that is unwound from a reel, and resisting unwinding of the chain from the reel by means of a brake.

3. An apparatus according to claim 1 which further comprises a mechanical unloading device that moves in the transport space and at a front of which are arranged mechanical unloading dischargers for loosening thermal insulation, wherein the unloading device comprises said unloading dischargers placed one above the other in the height direction which moves loosened thermal insulation existing against the mechanical unloading device to a collecting discharger, which is arranged at the bottom edge of the unloading device to collect and move loosened thermal insulation from opposite bottom edges of the transport space to a central discharge opening of the unloading device, from which the same is blown to the reception point by a blow arrangement, and wherein the unloading device is arranged to be moved in the transport space in the longitudinal direction towards a back wall of the container by a movement arrangement that is connected to the container and that is operated by an operating means connected with the back wall of the container by a chain operated by a winch.

4. A method for transporting blowable thermal insulation to a reception point comprising the steps of:

leading thermal insulation to an open ended container having a longitudinal direction, arranged to be transportable and defining a transport space, said container open towards an unloading end for unloading at the reception point;

filling the container by leading thermal insulation to a filling space which is bounded by said transport space and a movable partition, the partition providing closure of the open unloading end of the container;

said filling step changing the internal volume of the filling space by moving the partition in the longitudinal direction.

5. A method according to claim 4, wherein the filling space is expanded essentially by means of a pressure influence caused by thermal insulation being led into the filling space.

6. A method according to claim 5, wherein movement of the filling device is guided by operating means in order to achieve an appropriate density of thermal insulation in the filling space, said operating means comprising a retardable movement arrangement connecting the filling device to a back wall of the container with a chain that is unwound from a reel, and wherein unwinding of the chain from the reel is resisted by means of a brake.

7. A method according to claim 4, wherein for unloading blowable thermal insulation existing in the transport space, a mechanical unloading device is used that moves in the transport space, wherein at the front of the unloading device are arranged mechanical unloading dischargers for loosening thermal insulation existing against the mechanical unloading device, wherein loosened thermal insulation is moved by said unloading dischargers, which are placed one above the other in the height direction of the unloading device, to a collecting discharger arranged at the bottom edge of the unloading device to collect and move loosened thermal insulation from opposite bottom edges of the transport space to a central discharge opening of the unloading device, from which the same is blown to the reception point by a blow arrangement.

8. A method according to claim 7, wherein the unloading device is moved in the transport space in the longitudinal direction towards a back wall of the container by a movement arrangement that is connected to the container and is operated by operating means, which connects the unloading device with the back wall of the container by means of a chain operated by a winch.

* * * * *

UNITED STATES PATENT AND TRADEMARK OFFICE
CERTIFICATE OF CORRECTION

PATENT NO.    : 6,312,207 B1
DATED         : November 6, 2001
INVENTOR(S)   : Keijo Rautiainen It is certified that error appears in the above-identified patent and that said Letters Patent is hereby corrected as shown below:

Column 7,
Line 33, after "wherein" insert -- expanding the volume of --.
Line 34, delete "expanded essentially by means of a pressure influence".
Line 35, after "by" insert -- pressure of the --.

Column 8,
Line 1, delete "wherein".
Line 1, before "movement" insert -- including the step of guiding --.
Line 2, delete "is guided".
Lines 2-3, delete "in order to achieve".
Line 3, before "an" insert -- and controlling --.
Lines 4-8, delete ", said operating means comprising a retarable movement arrangement connecting the filling device to a back wall of the container with a chain that is unwound from a reel, and wherein unwinding of the chain from the reel is resisted by means of a brake".
Line 10, delete "wherein for".
Line 10, before "unloading" insert -- including the steps of --.
Line 11, after "space" delete ",".
Line 12, before "a" insert -- by --.
Line 12, delete "is used".
Lines 13-14, delete "wherein at the front of the unloading device are arranged mechanical unloading dischargers for".
Line 16, delete "wherein".
Line 16, before "loosened" insert -- moving --.
Lines 16-19, delete "is moved by said unloading dischargers, which are placed one above the other in the height direction of the unloading device,".
Line 19, delete "the".
Line 19, before "bottom" insert -- a --.
Line 24, delete "from which the same is blown to".
Line 24, before "the" insert -- and blowing thermal insulation from the central discharge opening of the unloading device to --.

UNITED STATES PATENT AND TRADEMARK OFFICE
CERTIFICATE OF CORRECTION

PATENT NO.    : 6,312,207 B1
DATED         : November 6, 2001
INVENTOR(S)   : Keijo Rautiainen It is certified that error appears in the above-identified patent and that said Letters Patent is hereby corrected as shown below:

<u>Column 8 cont'd,</u>
Line 27, before "the" insert -- including the step of moving --.
Line 27, delete "wherein".
Line 28, delete "is moved".

Signed and Sealed this

Twenty-second Day of April, 2003

JAMES E. ROGAN
*Director of the United States Patent and Trademark Office*